United States Patent [19]

Rybicki

[11] 4,203,708
[45] May 20, 1980

[54] ELASTOMERIC ROTOR LOAD REACTION SYSTEM

[75] Inventor: Robert C. Rybicki, Trumbull, Conn.

[73] Assignee: United Technologies Corporation, Hartford, Conn.

[21] Appl. No.: 919,358

[22] Filed: Jun. 26, 1978

[51] Int. Cl.² .................... B64C 11/06; B64C 27/38
[52] U.S. Cl. ............................ 416/134 A; 416/140; 416/141
[58] Field of Search ............... 416/106, 107, 134 A, 416/140 A, 141

[56] References Cited

U.S. PATENT DOCUMENTS

| | | | |
|---|---|---|---|
| 2,549,887 | 4/1951 | Buivid | 416/140 A |
| 2,906,348 | 9/1959 | Lovegrove | 416/140 A |
| 3,282,350 | 11/1966 | Kisovec | 416/140 |
| 3,853,426 | 12/1974 | Rybicki | 416/134 A |
| 4,028,001 | 6/1977 | Watson | 416/141 |

*Primary Examiner*—John J. Vrablik
*Attorney, Agent, or Firm*—Vernon F. Hauschild

[57] ABSTRACT

In a helicopter rotor in which the blades are supported for rotation and articulation from the hub by elastomeric bearings and including a lead-lag damper which acts to cause radially inward blade motion during rotor braking and including the improvement of utilizing members which move pivotally in response to centrifugal force and which serve blade flapping and droop stop functions both statically and dynamically and which further are programmed as a function of rotor speed to prevent or limit radial inward motion of the blade during the rotor braking operation.

6 Claims, 6 Drawing Figures

ELASTOMERIC ROTOR LOAD REACTION SYSTEM

BACKGROUND OF THE INVENTION

This invention relates to helicopter rotor heads of the elastomeric type wherein the rotor blades are connected to the rotor hub through one or more elastomeric type bearings. Such a rotor head is illustrated in my U.S. Pat. No. 3,782,854. The function of the elastomeric bearings in this rotor head application is to provide rotor blade retention and support while allowing the blade freedom in torsion as well as vertical and horizontal motion to a limited degree and within the shear capabilities of the bearings. These bearings are laminated structures comprising alternating layers of metal plates and elastomer. One of the concerns of the rotor head designer is to provide adequate structural restraint for the larger rotor blade motions which occur during rotor head starting and stopping operations, where the inertia and momentum of the blades tend to cause or allow them to move to lead or lag positions beyond their generally radial position occupied during flight. When a rotor head is started and being brought up to its full rotational speed, there is a tendency for the blades to lag behind the rotor hub until equilibrium is achieved. Similarly, when stopping under the speed retardation of a rotor brake, the blades have a tendency to advance into a lead position relative to the hub. By the configuration shown and claimed in my U.S. Pat. No. 3,759,632, the in-plane damper is connected to the root end of the blade, and its stroke is substantially in a perpendicular direction to the blade feathering axis. Angular rotation of a blade relative to the rotor hub in either the lead or lag direction will be damped by this configuration, and lead or lag excursions beyond a predetermined angle will be reacted by the interaction of the damper and the shaft/hub arm contacts. Experience revealed that this perpendicular relationship between the blade and damper resulted in a high load being imposed on the shear bearing located between the elastomeric bearings and the blade spar root end. While a reorientation of the damper to place its axis generally parallel to that of the blade span axis effectively lowers that high load, such reorientation could not be made without addressing and resolving the need to react the inwardly directed load that occurs when the blade moves to its lead stop and the damper bottoms, as caused by the application of the rotor brake to the hub. The problem caused by the inwardly directed load is its tendency to introduce a tension load into the elastomeric bearings at a time when the normally high compressive load on the bearings is reduced in proportion to the square of the rotor speed.

SUMMARY OF THE INVENTION

This invention addresses both the general problem associated with elastomeric bearings and inherent with some rubber type products, namely that tension loads to any significant degree are intolerable, and the very specific problem of reacting certain rotor blade loads in an elastomeric rotor head configuration wherein side loads imposed on the shear bearing are minimized by positioning the blade damper to stroke in a direction substantially parallel with the blade feathering axis. It is recognized that blade motion in one direction (e.g., a lag motion) will result in application of a compressive load on the elastomeric bearings as the lag stop is contacted. Such loading is desirable. A blade excursion in the other direction (e.g., a lead motion) will bottom the damper and would result in a tension load being imposed on the bearings. While elastomeric bearings are capable of withstanding large compressive loads, such bearings are capable of sustaining only slight tension loads before rupture occurs. It is an object of this invention to provide means in our elastomeric rotor head to restrict significant tension loads from being imposed on these rotor hub bearings.

In accordance with the teaching of this invention, the functions of droop and flap motion restriction are integrated with this additional requirement to limit the degree of tension load on the bearing. Both functions are able to be accomplished by structural modifications to the droop and flap stop members. Use of this invention in reacting tension loads has allowed us to accommodate a rotor brake and to reduce the loading on the shear bearing, and to maintain use of the damper for the dual functions of blade motion damping and in-plane load reaction.

It is a specific objective of this invention to teach the adaptation of structural members designed to limit blade vertical angular deflections while the rotor is at rest to provide the additional function of limiting the tension loading on the elastomeric bearings of a fully articulated rotor head.

DESCRIPTION OF THE INVENTION

Figure 1:
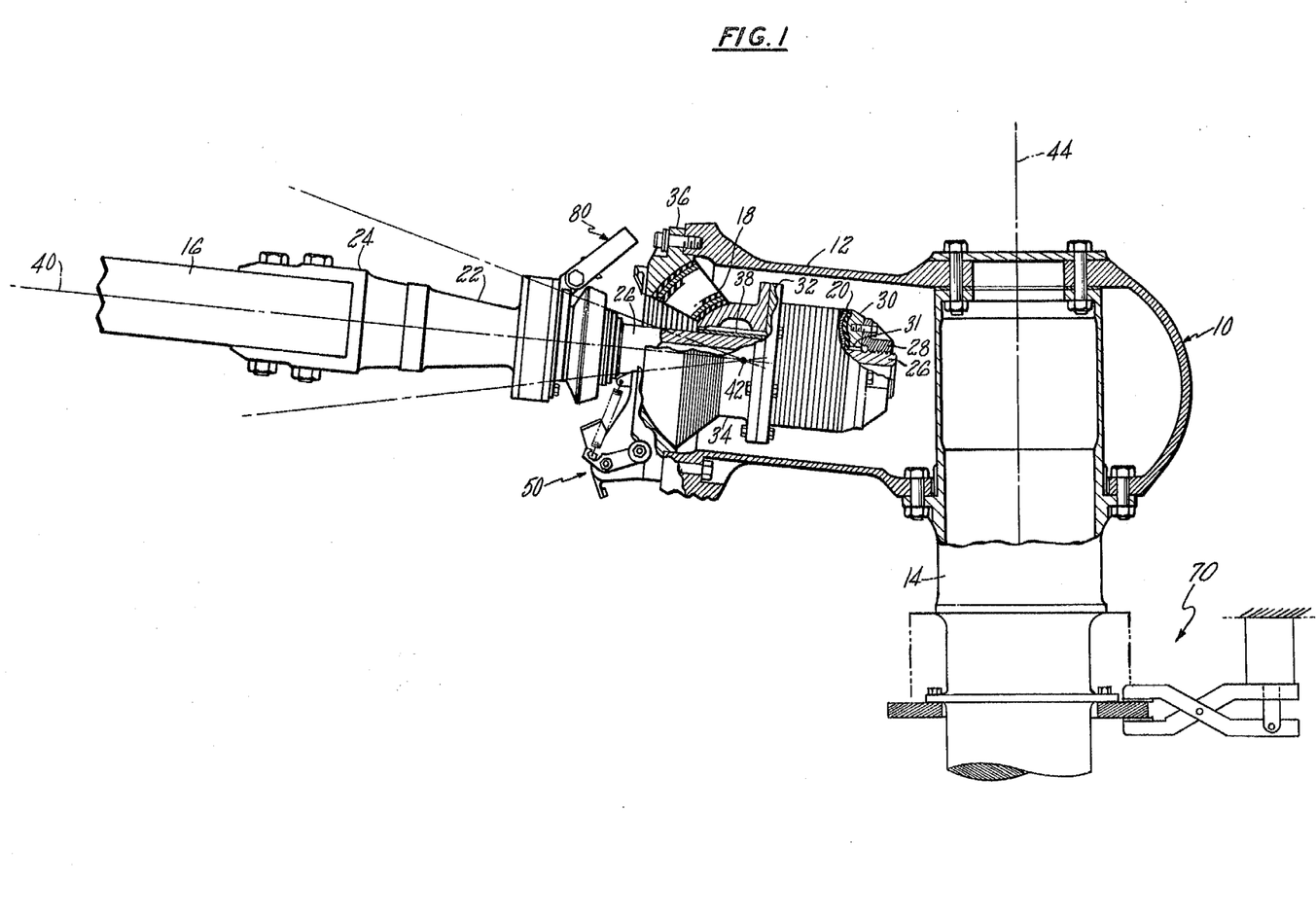
FIG. 1 is a side view, partially in cross section of an elastomeric rotor helicopter, showing one of the hub arms and a root end connection for a blade, and incorporating the teachings of this invention.

The typical Sikorsky type elastomeric helicopter rotor is depicted in FIG. 1 wherein hub 10 includes a plurality of hub arms 12, one of which is shown, and which hub 10 is bolted to the upstanding drive shaft 14. A rotor blade 16 is mounted to each hub arm 12 for full articulation in pitch change, droop, flap, lead and lag. The primary mount is an elastomeric bearing array consisting of spherical bearing 18 and thrust bearing 20. Blade 16 is attached to the inner end of thrust bearing 20 by means of cuff attachment 22 which is bolted to the blade root by its bifurcated arms 24. The inner end of attachment 22 forms stub shaft 26, which passes through the center of the bearing array, and is threaded at its inner end.

Figure 2:
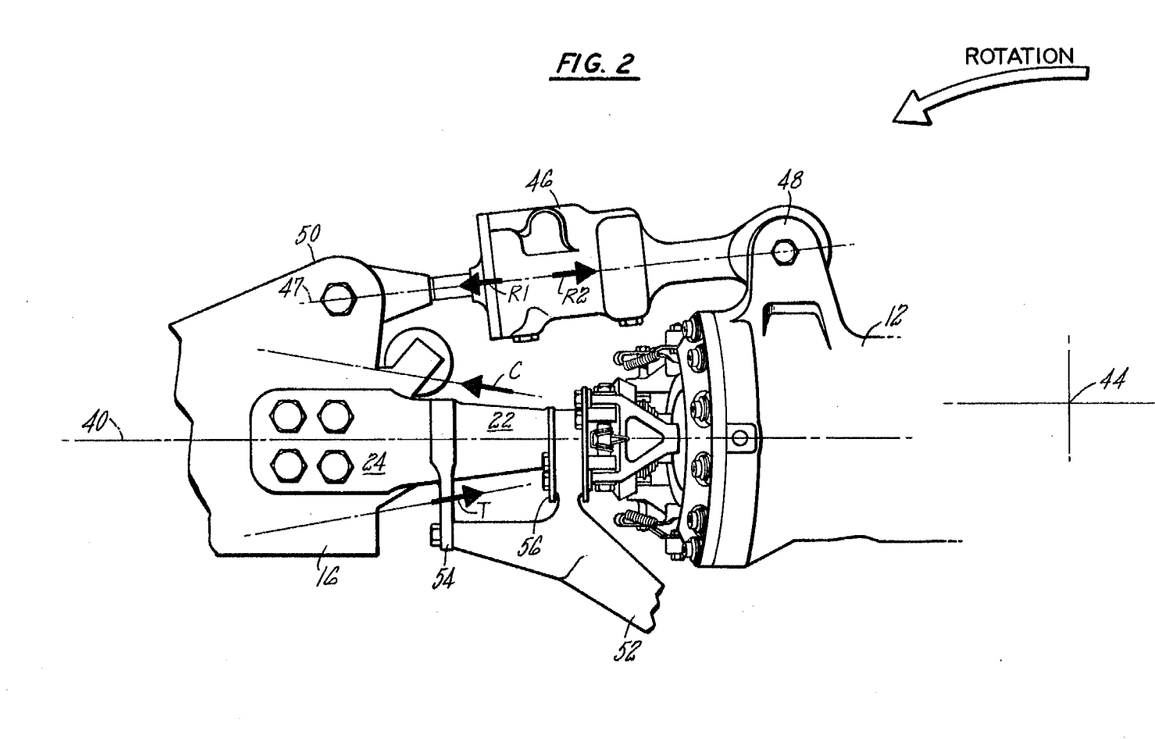
FIG. 2 is a top view of the rotor head of FIG. 1, illustrating the same hub arm and blade connection, and showing the damper connected between the hub and blade.

Nut 28 forms a shoulder for the shaft to restrain bearing 20. Race 30 of bearing 20 is mounted to the shaft 26 by a spline connection 31. The outer race 32 of bearing 20 is connected to the inner race 34 of spherical bearing 18. Outer race 36 of bearing 18 is bolted to the external end face of cylindrical hub arm 12. A journal bearing 38 is positioned between race member 34 and the blade shaft 26 to accommodate shear loading. With the blade thus attached to the bearing array, the centrifugal force created by rotor blade rotation will impose compressive loading on the bearings 18 and 20. These bearings are of the typical laminated elastomeric construction designed to react high compressive loads while allowing limited motion in shear. As more particularly described in my U.S. Pat. No. 3,782,854, bearings 18 and 20 share operational blade motions as the blade changes in pitch by its rotation about blade feathering axis 40. During flight, each blade will make excursions upward and downward as a function of the instant loading on that particular blade, which is related to the aircraft maneuver being performed, its gross weight, air density, etc. The focal point 42 for blade articulation lies on axis 40 and comprises the center of spherical bearing 18. Under a full operative compressive load, this focal point 42 will shift outward a slight amount as the elastomer laminates of both bearings are compressed. As indicated in FIG. 1, mechanical stops are used to limit flap and droop angles to predetermined maximums, in both flight and static conditions. Similarly, while designed to operate at a specific angular relationship with the hub arm axis 40 (see FIG. 2) each blade will also make in-plane excursions and will occasionally lag behind or lead ahead of its operational position by as much as ten degrees under certain conditions; namely when starting and when braking. With reference still to FIG. 2, these angles of maximum lead or lag are illustrated for the counterclockwise rotation of the rotor head about axis 44. Such in-plane blade motion is moderated by linear damper 46, which is oriented to stroke along its axis 47 in a direction generally parallel to blade axis 40. The inner end of damper 46 is connected by a spherical rod end bearing to hub arm 12 by means of flange 48, while its outer end is connected by means of a similar bearing to the root end of blade 16 at its trailing edge 50. FIG. 2 also illustrates the control horn 52, by which pitch change inputs are made to blade 16. Horn 52 attaches to cuff attachment 22 at flanges 54 and 56.

Turning back to FIG. 1, attention is directed to the static or on-ground, requirements to limit the blade motions in flap and droop to very small angles. The usual concern in this regard is to prevent excessive blade motions that would otherwise result in a blade contacting the ground or a part of the aircraft fuselage. Droop stop mechanisms used heretofore for elastomeric type rotors have followed the teachings of U.S. Pat. No. 3,778,189 to D. Ferris, and more specifically my U.S. Pat. No. 3,853,426. FIG. 8 of my patent, just identified, more particularly describes the basic droop stop structure upon which my present invention is based. Reference is made to U.S. Pat. No. 2,906,348 to J. Lovegrove for a general showing of an anti-flapping device.

Figure 4:
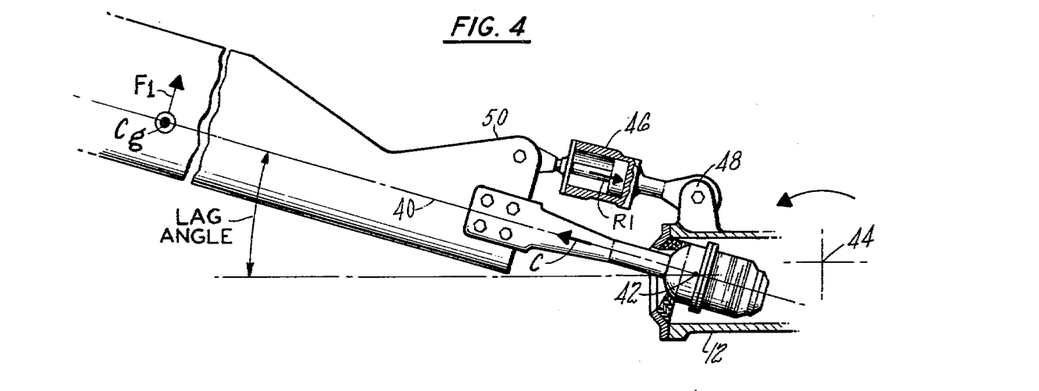
FIG. 4 is a showing of the blade and damper during rotor starting, illustrating the applicable forces.
Figure 5:
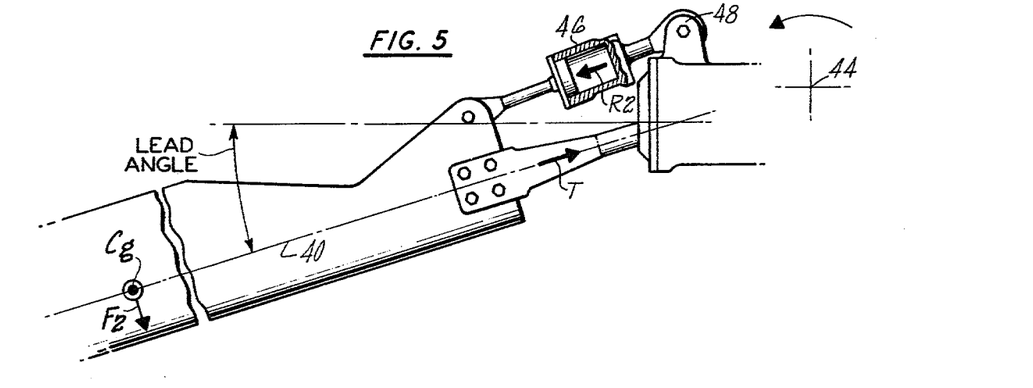
FIG. 5 is a showing of the blade and damper during rotor braking, also illustrating the applicable forces.

Before proceeding further to describe the specific teaching and configuration of this invention, it is important to realize that the teaching of my U.S. Pat. No. 3,759,632, which addresses in-plane excursions of the blade and provides means to react the resultant loads from excursions in either the lead or lag directions, is not usable in the rotor head embodiment of FIG. 1 & 2, due to the different orientation of the damper. In my last identified patent the damper axis is oriented perpendicular to the blade axis, and reaction loads of starting or braking are similarily oriented and reacted on opposite sides of the elastomeric bearing array by the damper and the contact edges of the hub arms, as described in that patent. As an improvement to minimize the shear loads on the journal bearing 38, the damper 46 orientation is repositioned from the perpendicular orientation to the blade stub shaft 26 as illustrated in my patents referenced above, to the parallel orientation shown in FIG. 2. FIG. 4 illustrates the action of rotor starting; wherein rotation is counterclockwise and the damper 46 is connected between the hub flange 48 and the blade trailing edge 50. With the blades at rest, acceleration of the rotor hub produces an inertia force ($F_1$) in each blade acting at its Cg about the focal point 42 of the main bearing 18, which causes the blade to lag behind its otherwise radial position. As the lag angle increases, the damper 46 collapses, and its piston is driven toward the inner cylinder wall. Upon bottoming of the damper piston, further lag motion is mechanically restricted, and an inward force as expressed by vector R1 is imposed on the damper and hub attachment 48. An equal and oppositely directed reaction load is imposed outwardly along blade axis 40, which load is depicted by vector (C). Such outwardly directed load introduces a compressive force on the bearings 18 and 20, which force is additive to the compressive load being generated on the bearings due to the centrifugal force developed by blade rotation. The bearings are inherently able to sustain such combined compressive loadings. Inplane blade motion in the other direction however, as from the operation of blade braking may result in an adverse condition, depending on the magnitude of the oppositely directed forces. The advantages of a reduced load on the shear bearing and the quicker rotor stopping capability offered by use of a rotor brake are available, once this adverse condition can be accommodated. A typical rotor brake installation 70 is depicted in U.S. Pat. No. 3,380,564 to Beurer, and FIG. 5 illustrates the action of rotor stopping. Application of the rotor brake to the rotor hub, as the blades continue to rotate under their own inertia, produces an inertia force ($F_2$) in each blade acting at its Cg about the blade focal point 42 of bearing 18. The blade lead angle increases as the damper 46 extends to the end of its stroke. When fully extended, further lead motion of the blade is prevented, and an outward force as expressed by vector R2 is imposed on the damper hub attachment 48. Likewise, an equal and oppositely directed reaction load is imposed inwardly along blade axis 40, which load is depicted by vector (T). This load is expected to be in the order of 3000 lbs. for the S-76 model helicopter, which has a max gross weight of 9700 lbs. The usual centrifugal force generated by blade rotation and acting on each blade is expected to be about 30,000 lbs. at full operational speed. Of course the rotor brake is not applied to the rotor head when it is being driven, nor when it is at or near full RPM. However, in order to bring the rotor to a stop in a short time, as may be desired in the case of a shipboard landing, the rotor brake will be applied shortly after power is removed from the rotor, such as when its rotation speed has decayed to about 60–75%. With the rapid decay of the centrifugally generated force, and the presence of the oppositely directed reactive load (T), there will come a time when the summation of the two is a resultant inward directed force. If allowed to reach the bearings 18 and 20, this inward force could place the bearings in tension, and effect a rupture in either or both bearings.

Figure 6:
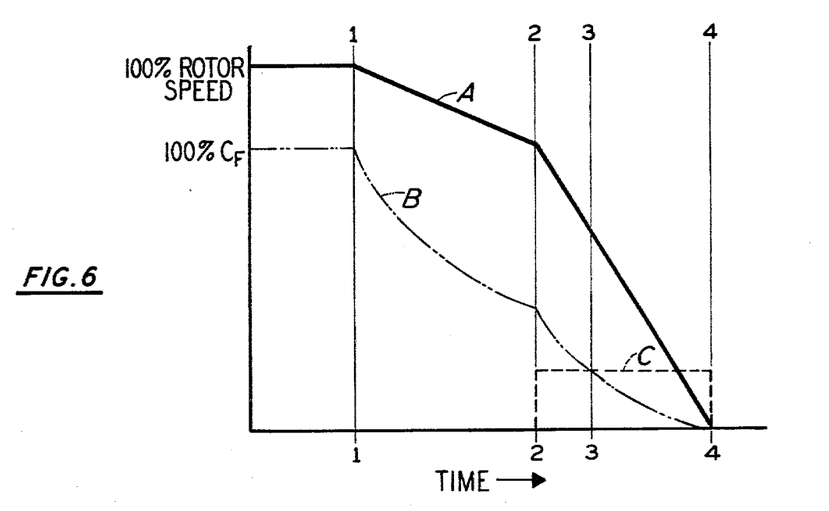
FIG. 6 graphically depicts the time phased relationship between rotor RPM, blade centrifugal force, and rotor brake reaction force during a typical rotor stop, as the rotor brake is applied.

Since it is important to fully understand this possible adverse relationship, FIG. 6 has been prepared to depict these oppositely directed loads and forces imposed on the blades, plotted against time. Since the figure is illustrative of the effects of rotor stopping only, the ordinate represents a point in time when the helicopter rotor is operating at full speed, while the craft has just landed and the pilot is intending to park and shut down. As time is advanced toward this objective, ordinates 1 through 4 indicate respectively the points in time when: 1 power is withdrawn as by the shut-down of the engines; 2 the rotor brake is applied; 3 the critical point is reached when the centrifugal force is equalized by the oppositely directed brake reaction load; and 4 the rotor comes to a complete stop.

Curve A depicts rotor speed over the course of points 1 through 4 where percent of speed is plotted against time. Until time point #1, the rotor speed is constant and starts to decay at this point somewhat slowly thereafter to about a 60-75% level until point #2 when the brake is applied. Upon the application of the brake, rotor speed decreases more abruptly to zero at point #4.

Curve B depicts the decrease of rotor blade centrifugal force as percent of such force is plotted against time. From a full 100% value at rotor operational speed, and as a function of decaying rotor speed, decreases in centrifugal force rates occur at points #1 and 2, and the generated force continues to decrease until the rotor speed becomes zero.

Curve C depicts the torque load on each rotor blade which is introduced at point #2 upon the application of the rotor brake.

When the rotor brake is applied at point #2 on FIG. 6, a torque load is produced which decelerates the rotor. The blade inertia force $F_2$ as depicted on FIG. 5 causes the blade to continue to move in the same rotary direction ahead of the slowing rotor hub as the blade pivots about its focal point 42. When the blade reaches its maximum lead angle and damper 46 is extended to its fullest, force $R_2$, is imposed on the damper and reaction load T is imposed on the blade. This reaction load T, as depicted as Curve C in FIG. 6 is inwardly directed, and is substantially constant in magnitude until the rotor is stopped. Point #3 on FIG. 6 identifies the critical point in time when the decaying centrifugal force of curve B reacting outward on each blade, is exactly opposed by the substantially constant and inwardly directed brake reaction force of curve C. With curves B and C superimposed as shown, it becomes apparent that between point #3 to point #4 the adverse condition of an inward force upon the elastomeric bearings can occur.

A major teaching of this invention is the provision of means, compatible with both the respective dynamic and static blade excursion freedom and restriction requirements, which will prevent such intolerable tension force from being applied to either bearing. Reference is repeated to my U.S. Pat. No. 3,853,426 pertaining to a droop stop for an elastomeric bearing type helicopter rotor. Droop stop 50, as depicted in FIG. 1 herein is similar to that as shown in FIG. 8 of my last identified patent, with specific modifications and additions as described hereinafter. Likewise, reference is repeated to U.S. Pat. No. 2,906,348 to J. Lovegrove pertaining to an anti-flapping stop. Anti-flap stop 80, as depicted in FIG. 1 provides the function indicated in the Lovegrove patent, with specific modifications and additions as described hereinafter so as to provide the additional inventive function desired.

Figure 3:
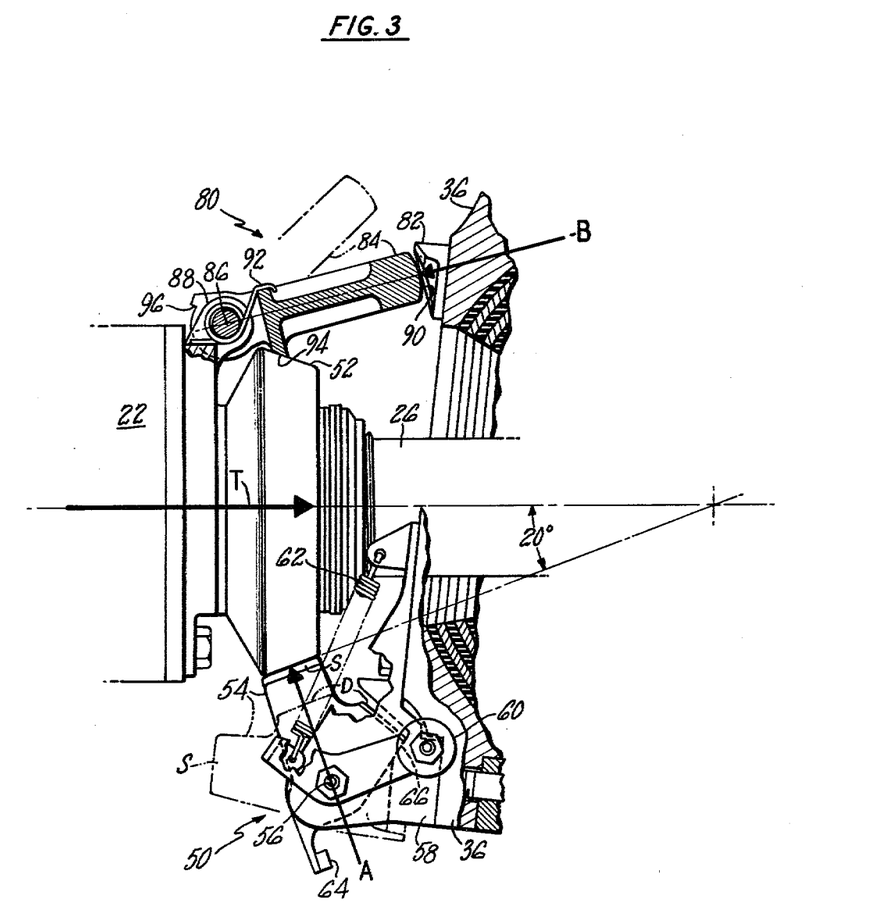
FIG. 3 is a view of the droop stop and anti-flap mechanisms of FIG. 1, shown in a large scale, with the reaction vectors indicated.

FIG. 3 illustrates the droop stop 50 mechanism and anti-flap stop member 80 in their static positions, wherein they perform their accustomed functions respectively of limiting droop and flap of the blade, as follows. As shown, rotatable collar 52 is in contact with static surface "S" of stop member 54, which pivots about axis 56 and is supported from bifurcated bracket 58, either integral with or connected to race 36. A second surface "D" on stop member 54 is provided to contact the collar 52 under flight or dynamic conditions. The phantom lines depict the location of surfaces "S" and "D" in flight, wherein stop member 54 has rotated counterclockwise under centrifugal force influence of weight 60, opposing return spring 62. Bumper 64 limits the counterclockwise motion of stop member 54, while shoulder 66 limits its clockwise motion. Both the bumper 64 and shoulder 66 are configured to strike a portion of the fixed bracket 58. As described subsequently, droop stop rotation has been reversed from the direction stipulated in my U.S. Pat. No. 3,853,426.

Anti-flap stop 80 is similarly configured to provide a dual angularity limiting function to upward blade motion. Pad 82 is fixed to bearing race 36, and may serve as a dynamic stop to be contacted by rotatable collar 52. Anti-flap stop 80 comprises stop member 84, pivotable about axis 86 and is supported by bifurcated bracket 88 which is either integral with or is connected to blade cuff 22. As shown, the end portion 90 of stop member 84 contacts pad 82, under the urging of spring 92. The phantom lines depict the location of the stop member 84 in flight, wherein it has rotated counterclockwise under the centrifugal force influence of its own weight, opposing the spring 92. Bumper 94 limits the clockwise motion of stop 84 in contacting the collar 52, while shoulder 96 limits its counterclockwise motion in contacting an abutment on cuff 22.

Earlier it was explained in connection with the force vectors illustrated on FIG. 5, that it was important to address the possibility that a tension load "T" could be imposed on each rotor blade which at a point in time as rotor speed decreases may be larger in magnitude than the centrifugal force directed oppositely. To preclude this full tension load from being imposed on either or both of the bearings 18 and 20, the droop and anti-flap stops are configured to provide a physical inward restraint for the blade as it tends to unload itself, and as the compressive forces on the bearings 18 and 20 diminish. As shown in FIG. 3, contact of the blade mounted collar 52 with the hub mounted droop stop 50, and contact of the blade mounted anti-flap stop 80 with the hub mounted pad 82 serve together to respectively generate reactive forces depicted as vectors A and B, the axial components of which are in combination equal and opposite to force Vector T. Vectors A and B are normal to droop and flap stop contacting surfaces, and pass through their respective pivot points 56 and 86 so as not to generate eccentric moments on the droop and flap stops 50 and 80.

Several specific points must be noted relative to the integrated functioning of the droop and anti-flap stops mechanisms. First, it must be recognized that with no load on the bearings 18 and 20 there must be a small clearance between the contacting stop surfaces to allow rotation of the stops in and out of position without interference. This clearance is in the order of 0.025" and can be adjusted by rotation of the spindle nut 28 to compensate for compression set in the elastomeric bearings 18 and 20. Such clearance is acknowledged to allow a slight but tolerable tension load on the bearings 18 and 20, but it is important that it not be exceeded. This slight clearance must also be maintained as a maximum amount regardless of the lead, lag, or pitch orientation of the blade. Therefore, the contact surfaces of the blade collar 52 and surface "S" of stop member 54 must be conical, while the surface 90 of anti-flap member 84 is spherical, and that of pad 82 is conical. The conical surface of pad 82 is slightly sloped from the tangent of the contact point of the surface 90 to result in a slight wedging action imposed on stop 84 to urge its further clockwise rotation and to function as a lock. The wedging action of the anti-flap stop 80 must be produced in the droop stop mechanism 60 as well. As shown, the angle between the collar 52 and stop member 54 should be not less than 20 degrees. Otherwise, there might be a tendency for the blade collar 52 to slide inward on the droop stop 54. Further, there must be a positive limit to the clockwise rotation of the stop member 54, which is accomplished by the contact of its face 66 with the front face of the bracket 58. In the configuration illustrated in FIG. 8 of my U.S. Pat. No. 3,853,426, droop stop rotation is in the opposite direction and unless modified as described herein, inward force T would tend to rotate the stop member clockwise toward its flight position and allow inward sliding of the blade. The force of the retaining spring would not be strong enough to oppose such inward force. As mentioned heretofore, the surface contact of shoulder 66 with bracket 58 limits rotation of stop member 54, and any frictional moments are reached here.

It is important to the teaching of this invention to program the rotating action of droop stop mechanism 50 and anti-flap stop mechanism 80 by relating the spring rate of respective springs 62 and 92 to the fly weights 60 of the droop stop 50 and weight of the anti-flap member 84 and the centrifugal forces developed on those weights, such that the droop stop mechanism 50 is rotated to its static position prior to the seating of the anti-flap stop 84 in its static position, where the heretofore described wedging action will lock it in place. In addition to this series type movement of the two stops, their motion must also be coordinated to seat both stops prior to decay of the blade centrifugal force to the level of equality of the inward braking reaction force "T". It has been determined by analysis and test that to assure timely seating of the dual stop members, the droop stop mechanism 50 should be automatically rotated to its static position at 50% of rotor speed, and that the anti-flap stop mechanism 80 should be automatically rotated to its static position at 30% of rotor speed. Springs 62 and 92 are designed to a specific stiffness to produce a restoring moment about pivot points 56 and 86 which will overcome the centrifugal and weight moments at 50% and 30% rotor speed as required.

I claim:
1. A helicopter rotor comprising:
 (1) a hub mounted for rotation about an axis of rotation,
 (2) at least one blade projecting radially from said hub,
 (3) an elastomeric bearing supporting said blade from said hub for universal motion thereabout and so that rotation of the blade with said hub generates centrifugal force which causes a radially outward motion of the blade to exert a compressive load upon the elastomeric bearing,
 (4) a lead-lag damper comprising a cylinder-piston mechanism extending substantially parallel to said blade and connected at its opposite ends to said blade and said hub to resist lead-lag motion of said blade,
 (5) brake means operatively associated with said hub to reduce the speed thereof and hence cause said blade to lead and thereby cause said damper to impose a force on the blade to cause a radial inward motion of the blade to exert a tension load on said bearing in opposition to said compression load,
 (6) and restraint means operative in response to centrifugal force from a first position wherein universal motion between said blade and said hub is permitted during flight operation and to a second position at a selected rotor rpm to prevent further inward motion of the blade when the bearing compressive load and the bearing tension load are substantially equal to thereby prevent the imposition of tension load on the bearing beyond a selected limit.

2. A helicopter rotor having a plurality of blades, each connected at its inboard end to a hub arm by a spherical elastomeric bearing for full articulated blade motion, wherein the centrifugal force of rotor rotation imposes a first load on each blade producing a compressive first operating load on the bearing, the rotor including droop and flap stops, an in-plane lead/lag damper, a droop and flap stop contact member mounted on each blade, and a rotor brake operative to impose an outward load on the damper and a second load on each blade in a direction opposite such first load, the improvement comprising restraint means associated with such blade contact member and droop and flap stops to oppose inward motion of the blade due to said second load, the restraint means including droop and flap stop counter weights and return springs operable to rotate their respective stops to and from their static and dynamic position at approximately 50% and 30% respectively of rotor speed, total clearance between the stops and their abutting surfaces being substantially 0.025" in the static conditions, and dual stop means for the droop and flap stops preventing rotation in both directions beyond their static and dynamic positions.

3. A helicopter rotor having a central hub, a plurality of radially extending hub arms integral with said hub, a blade attached at its inboard end to each hub arm by a spherical elastomeric bearing for full articulated blade motion, wherein the centrifugal force of rotor rotation imposes a first load on each blade producing a compressive operating load on the bearing, a load reacting shear bearing associated with each blade root end attachment, said rotor including droop and flap stops, an in-plane lead/lag damper connected to each blade, each damper having its axis parallel to the axis of its associated blade, a blade mounted droop and flap stop contact member, a rotor brake wherein the forces at each blade due to rotor braking impose both an outward load on the blade connected damper and a second load on each blade in a direction opposite such first load, the improvement comprising restraint means associated with such droop and flap stops and such contact member to oppose inward motion of the blade due to said second load, the restraint means including droop and flap stop counter weights and return springs operable to rotate their respective stops to and from their static and dynamic position at predetermined percentages of rotor speed, total clearance between the stops and their abutting surfaces being substantially 0.025" in the static condition, and dual stop means for the droop and flap stops operative to prevent rotation in both directions beyond their static and dynamic positions.

4. A helicopter rotor according to claim 3, and including means to adjust said total clearance to adjust for compression set in said elastomeric bearing.

5. A helicopter rotor comprising:
   (1) a hub mounted for rotation about an axis of rotation,
   (2) at least one blade projecting radially from said hub,
   (3) an elastomeric bearing supporting said blade from said hub for universal motion thereabout and so that rotation of the blade with said hub generates centrifugal force which causes a radially outward motion of the blade to exert a compressive load upon the elastomeric bearing,
   (4) a lead-lag damper comprising a cylinder-piston mechanism extending substantially parallel to said blade and connected at its opposite ends to said blade and said hub to resist lead-lag motion of said blade.
   (5) brake means operatively associated with said hub to reduce the speed thereof and hence cause said blade to lead and thereby cause said damper to impose a force on the blade to cause a radial inward motion of the blade to exert a tension load on said bearing in opposition to said compression load,
   (6) and restraint means operative in response to centrifugal force from a first position wherein universal motion between said blade and said hub is permitted during flight operation and to a second position at a selected rotor rpm to prevent further inward motion of the blade when the bearing compressive load and the bearing tension load are substantially equal to thereby prevent the imposition of tension load on the bearing beyond a selected limit, and wherein said restraint means comprises:
   (a) a ring member connected to the blade,
   (b) a first centrifugal force responsive means operable between a first position to cooperate with said ring member to permit selected blade droop during flight operation and a second position at substantially 50% rotor designed speed to cooperate with said ring member to permit second selective blade droop, and
   (c) a second centrifugal force responsive means operable between a first position to cooperate with said ring member to permit selected blade flap during flight operation and a second position at substantially 30% rotor designed speed to cooperate with said ring member and said first means when said first means is in its said second position to prevent radially inward motion of the blade during rotor braking to thereby prevent tension loading of the elastomeric bearing.

6. A helicopter rotor according to claim 5 wherein said second means is positioned and sized to define a selected clearance with said hub to thereby permit motion of the first and second means when the rotor is stopped.

* * * * *

UNITED STATES PATENT AND TRADEMARK OFFICE
CERTIFICATE OF CORRECTION

PATENT NO. : 4,203,708
DATED : May 20, 1980
INVENTOR(S) : Robert C. Rybicki

It is certified that error appears in the above—identified patent and that said Letters Patent are hereby corrected as shown below:

Column 7, Line 31    After "are" delete "reached" and insert --reacted--

Signed and Sealed this

Eighteenth Day of November 1980

[SEAL]

Attest:

SIDNEY A. DIAMOND

*Attesting Officer*    *Commissioner of Patents and Trademarks*